(12) United States Patent
Harvey

(10) Patent No.: US 10,495,731 B2
(45) Date of Patent: Dec. 3, 2019

(54) WAVEFORM PEAK DETECTION AND TIMING FOR RADAR APPLICATIONS

(71) Applicant: James Francis Harvey, Almonte (CA)

(72) Inventor: James Francis Harvey, Almonte (CA)

( * ) Notice: Subject to any disclaimer, the term of this patent is extended or adjusted under 35 U.S.C. 154(b) by 823 days.

(21) Appl. No.: 14/991,435

(22) Filed: Jan. 8, 2016

(65) Prior Publication Data

US 2017/0234970 A1   Aug. 17, 2017

(51) Int. Cl.
| | |
|---|---|
| *G01S 7/35* | (2006.01) |
| *G01S 7/03* | (2006.01) |
| *G01S 7/292* | (2006.01) |
| *G01S 7/40* | (2006.01) |
| *G01S 13/10* | (2006.01) |
| *G01S 13/44* | (2006.01) |
| *G01S 13/58* | (2006.01) |
| *G01S 13/93* | (2006.01) |
| *G01S 13/18* | (2006.01) |

(52) U.S. Cl.
CPC .............. *G01S 7/352* (2013.01); *G01S 7/032* (2013.01); *G01S 7/2922* (2013.01); *G01S 7/4026* (2013.01); *G01S 13/10* (2013.01); *G01S 13/4445* (2013.01); *G01S 13/588* (2013.01); *G01S 13/931* (2013.01); *G01S 13/18* (2013.01); *G01S 2013/9375* (2013.01)

(58) Field of Classification Search
CPC ...... G01S 7/032; G01S 7/2922; G01S 7/4026; G01S 13/10; G01S 13/4445; G01S 13/588; G01S 13/931; G01S 7/352; G01S 13/18; G01S 2013/9375
USPC ........................................................ 342/195
See application file for complete search history.

(56) References Cited

U.S. PATENT DOCUMENTS

| | | | | |
|---|---|---|---|---|
| 3,209,353 | A * | 9/1965 | Wiener ................... | G01S 13/94 342/65 |
| 3,281,787 | A * | 10/1966 | Trimble ................. | G06K 9/645 382/208 |
| 3,599,204 | A * | 8/1971 | Severin .................. | H03M 1/44 341/162 |
| 3,967,283 | A * | 6/1976 | Clark .................... | G01S 13/343 342/28 |
| 4,117,483 | A * | 9/1978 | Fujiki ................... | G01S 7/2922 342/105 |

(Continued)

FOREIGN PATENT DOCUMENTS

| | | | | |
|---|---|---|---|---|
| EP | 0286623 A2 | * | 10/1988 | ............. G01S 7/534 |
| KR | 100697821 B1 | * | 3/2007 | ............. G01S 13/10 |

*Primary Examiner* — Vladimir Magloire
*Assistant Examiner* — Nuzhat Pervin
(74) *Attorney, Agent, or Firm* — Brion Raffoul

(57) ABSTRACT

Systems, methods, and devices relating to radar and radar-based applications. A number of comparators are coupled in parallel with each comparator comparing an incoming signal and a predetermined value. If the predetermined value is exceeded by the incoming signal, the comparator output is set to trigger a flip flop. The predetermined value changes with each comparator and, with the signal being the radar reflection from a radar pulse, this allows for the detection of the peak value of the incoming signal. The circuit may be extended so that the output of the comparator which is triggered by the highest peak from the incoming signal is latched. Other variants include being able to count the clock cycles before the highest peak is detected within the range cell.

19 Claims, 15 Drawing Sheets

(56) References Cited

U.S. PATENT DOCUMENTS

| | | | | |
|---|---|---|---|---|
| 4,135,161 A * | 1/1979 | Torrieri | H03K 5/1534 327/1 |
| 4,302,973 A * | 12/1981 | Yoshino | G01C 5/06 73/178 T |
| 4,480,271 A * | 10/1984 | Coleman, Jr. | H04N 9/808 375/240.01 |
| 4,627,075 A * | 12/1986 | Fleming, III | G01S 7/006 327/31 |
| 4,628,312 A * | 12/1986 | Hwang | G01S 7/006 244/190 |
| 4,668,950 A * | 5/1987 | Russell, Jr. | F41G 7/306 244/190 |
| 4,704,574 A * | 11/1987 | Nossen | G01R 25/08 324/76.47 |
| 4,748,446 A * | 5/1988 | Hayworth | F41G 7/306 244/190 |
| 4,764,769 A * | 8/1988 | Hayworth | F41G 7/306 342/50 |
| 5,231,397 A * | 7/1993 | Ridkosil | H03K 5/1532 341/132 |
| 5,510,790 A * | 4/1996 | Borgen | H03M 1/0641 341/131 |
| 5,565,870 A * | 10/1996 | Fukuhara | G01S 7/2926 342/70 |
| 5,646,623 A * | 7/1997 | Walters | G01S 13/32 342/112 |
| 5,812,081 A * | 9/1998 | Fullerton | H01Q 9/28 342/21 |
| 6,115,113 A * | 9/2000 | Flockencier | G01S 7/4812 356/5.01 |
| 6,606,051 B1 * | 8/2003 | Fullerton | G01S 7/282 342/21 |
| 6,678,039 B2 * | 1/2004 | Charbon | G01S 7/487 342/135 |
| 6,771,076 B1 * | 8/2004 | Smith | G01R 31/11 324/533 |
| 2002/0196176 A1 * | 12/2002 | Fullerton | G01S 7/282 342/21 |
| 2003/0001769 A1 * | 1/2003 | Fullerton | G01S 7/282 342/21 |
| 2003/0016157 A1 * | 1/2003 | Fullerton | G01S 7/282 342/27 |
| 2003/0095063 A1 * | 5/2003 | Fullerton | G01S 7/282 342/118 |
| 2004/0051859 A1 * | 3/2004 | Flockencier | G01S 7/487 356/4.01 |
| 2005/0017893 A1 * | 1/2005 | Fullerton | G01S 7/282 342/118 |
| 2005/0017894 A1 * | 1/2005 | Fullerton | G01S 7/282 342/118 |
| 2005/0242983 A1 * | 11/2005 | Fullerton | G01S 7/2926 342/22 |

* cited by examiner

WAVEFORM PEAK DETECTION AND TIMING FOR RADAR APPLICATIONS

TECHNICAL FIELD

The present invention relates to radar and radar related applications. More specifically, the present invention relates to systems and methods for use with peak detection methods in radar applications.

BACKGROUND

The field of radar dates back to the mid-20th century. In its early days, it was used to detect the direction and number of incoming aircraft. Nowadays, its uses are varied and myriad. However, one potential drawback of all radar applications is the hardware complexity and computational load required to analyze radar signals.

Currently, some radar systems may be found in cars and trucks to provide an early warning of potentially hazardous conditions. However, such systems require complex circuitry and data processing to achieve these ends.

Another major issue plaguing vehicular radar systems, especially those using microwave radars, relates to beamwidth, that is, the angular width of the main lobe of the radar, and the associated angular resolution of the microwave radar. The beamwidth is inversely proportional to the antenna diameter in wavelength. With the limitation in the antenna size, it is very difficult to construct a reasonably sized microwave radar with a beamwidth of 1-4 degrees, both in azimuth and elevation. In addition, to provide azimuth and elevation data, the sensor either mechanically sweeps the antenna over the Field Of View (FOV), or electronically switches between emission/reception angles. The FOV is usually 10-15 degrees. At the desired scanning distance, this beamwidth will scan an area which is much too big and thus is too nonspecific and difficult to differentiate between the received echoes. Besides getting echo from another car in front of it, this radar will also receive echoes from other surrounding artefacts such as roadside signs, trees or posts, or bridges overpassing an expressway. On highways with divided lanes, the microwave radar will receive echoes from cars two to three lanes away and will have difficulty differentiating such echoes from echoes coming from objects in the same lane. Because of the poor angular resolution of microwave radars, the direction of objects cannot be specifically determined and objects too close to one another cannot be separated. The angular resolution of microwave radars is not small enough for them to be effectively used to monitor roadway traffic. The other disadvantage is that microwave radars have difficulty in distinguishing radar signals coming from adjacent cars with similar equipment. If there are more than two cars with the same radar equipment on the same scene, the signals become very confusing.

There is therefore a need for systems, methods, or devices which address the issues with the prior art. Such solutions, ideally, mitigate if not overcome these shortcomings of the prior art.

SUMMARY

The present invention provides systems, methods, and devices relating to radar and radar-based applications. A number of comparators are coupled in parallel with each comparator sequentially comparing an incoming signal with one of a number of predetermined values. If the predetermined value is exceeded by the incoming signal, the comparator output is set to the "exceeded" condition (i.e. high). The predetermined value changes with each comparator and, with the signal being the radar reflection from a radar pulse, this allows for the detection of the peak value of the incoming signal. The circuit may be extended so that the output of the comparator which is triggered by the highest peak from the incoming signal is latched. Other variants include being able to count the clock cycles before the highest peak is detected and having the detection only correspond to a single range cell.

In a first aspect, the present invention provides a system for detecting reflected radar signals, the system comprising:
  a peak detection block for detecting a peak in a waveform of a reflected radar signal, said peak detection block receiving said waveform from a sensor;
  a peak latch for latching a peak value of said waveform, said peak latch receiving a signal to latch a current value of said waveform from said peak detection block;
  a clock/count block for counting a number of cycles before said peak is reached and for determining limits of a range cell;
  a count latch for latching a count when a peak in said waveform is reached, said count latch receiving a signal to latch a current value of a count from said clock/count block;
  wherein
  said clock/count block sends a reset signal to said peak detection block once an end of a range cell has been reached.

In a second aspect, the present invention provides a circuit for detecting a peak value of a waveform, the circuit comprising a plurality of comparators coupled in parallel and receiving said waveform, each comparator being for comparing a current value of said waveform with a specific predetermined value different from predetermined values for other comparators, each comparator having a specific output when said current value of said waveform is greater than said specific predetermined value, wherein said waveform is a reflected signal from a radar.

In a third aspect, the present invention provides a method for detecting a reflected signal, the method comprising:
  a) transmitting a radar signal;
  b) receiving a signal;
  c) passing a waveform of said signal through a plurality of comparators, each of said comparators comparing a current value of said waveform with a specific predetermined value;
  d) for each of said plurality of comparators, in the event said current value exceeds said specific predetermined value, outputting a trigger value;
  e) using said trigger value to latch a current value of said waveform;
  f) determining which range count corresponds to said current value.

In a fourth aspect, the present invention provides a system for detecting an Angle Of Arrival (AOA) of a reflected radar signal, the system comprising of:
  at least two antennas constructed and arranged with a "squint" off of a common boresight such that the beams overlap. This allows for static monopulse processing of the reflected signal (i.e. no mechanical or electronic scanning).

In a fifth aspect, but as a requirement of all antenna arrays, a method of statically and dynamically calibrating the AOA accuracy, consisting of:
  one or more test signal/target probes for calibrating boresight;

one or more test signal/target for calibrating the beamwidth pattern of the monopulse beamwidth(s).

BRIEF DESCRIPTION OF THE DRAWINGS

The embodiments of the present invention will now be described by reference to the following figures, in which identical reference numerals in different figures indicate identical elements and in which.

DETAILED DESCRIPTION

Figure 1:
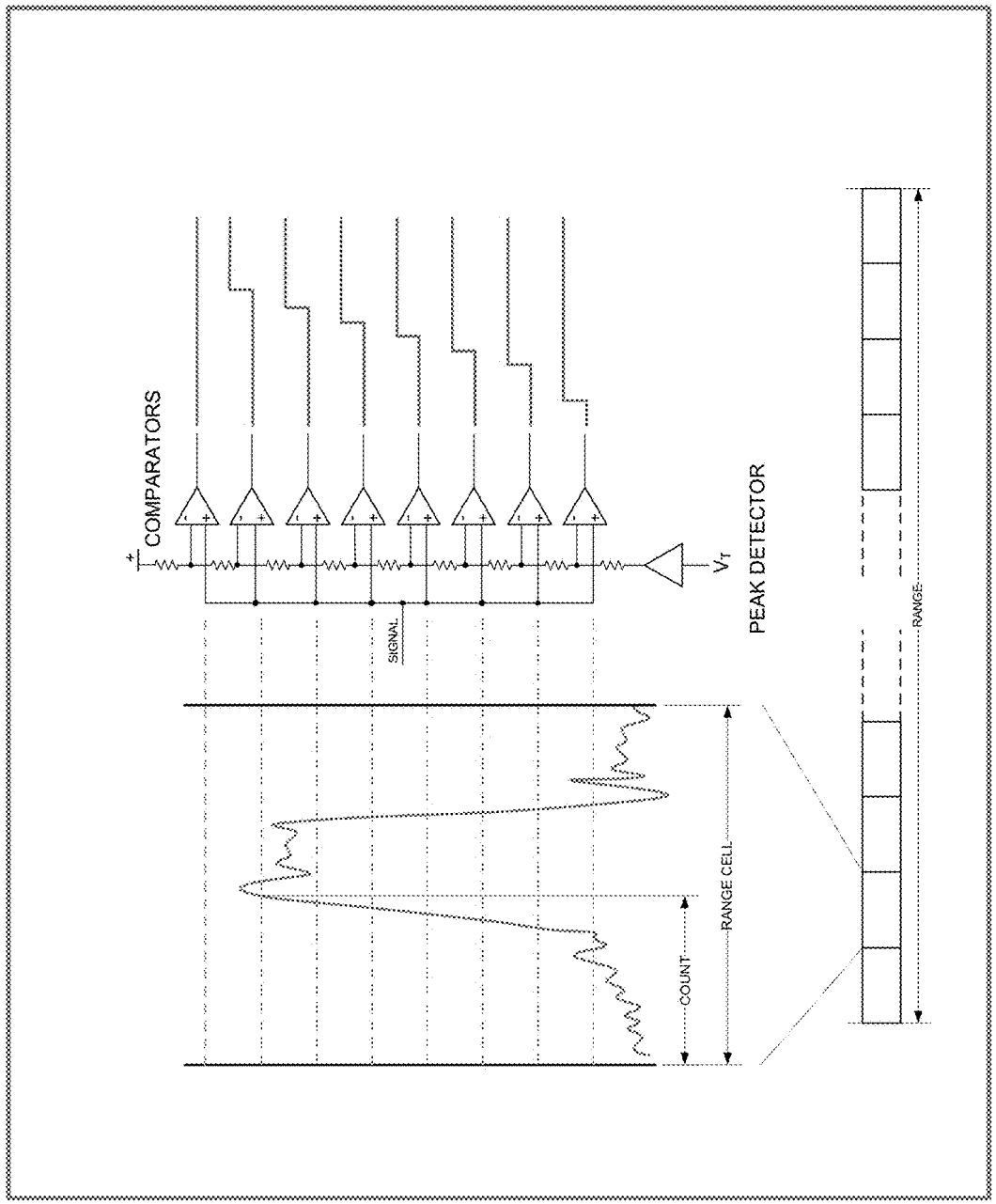
FIG. 1 illustrates a concept according to a first aspect of the present invention.

Referring to FIG. 1, the concept of one aspect of the invention is illustrated. The peak of a waveform can be detected by passing the waveform through a series of comparators over time, each comparator comparing the current value of the waveform to a predetermined level or value. The multiple comparators sequentially compare the waveform to progressively larger values. As the value of the waveform increases, if the waveform's value exceeds the predetermined value to which it is compared to by a specific comparator, that comparator's output is set to a given trigger value (for example, the output can be set to HIGH). If the waveform's value does not exceed the predetermined value to which it is compared to by a specific comparator, then that comparator's output is set to a different trigger value (for example, the output can be set to LOW). As can be seen in FIG. 1, as the value of the waveform on the left increases, the output of the various comparators on the right is set to high. The time at which each comparator's output is set to high corresponds to when the waveform's value exceeds that comparator's set predetermined value or the value used to compare with the waveform value. Thus, as can be seen in FIG. 1, the value for the topmost comparator is never exceeded and, as such, its output is never set to high. The lowermost comparator, on the other hand, had its predetermined value exceeded by waveform at an early time. The other comparators had their outputs triggered to high as the value of the waveform greatly increased.

This concept of peak detection can be used to locate a single target in a range cell. From FIG. 1, it can be seen that the waveform is from one of multiple range cells (see bottom of FIG. 1). The present invention can be used in primary surveillance radar (PSR) if one assumes that two or more targets will not normally be in a small range cell. This novel peak detection technique can greatly reduce the hardware complexity and processing load normally used for target detection.

The present invention also has the advantage that it can be used to determine the time to the peak target within the range cell. This allows for the speed of the target towards/away from the sensor to be determined from two or more pulses (P1, P2, etc.).

This aspect of the invention operates by detecting the reflected signal from the target. By detecting the highest peak from the reflected signal, the true distance from the target can be found.

Figure 2:
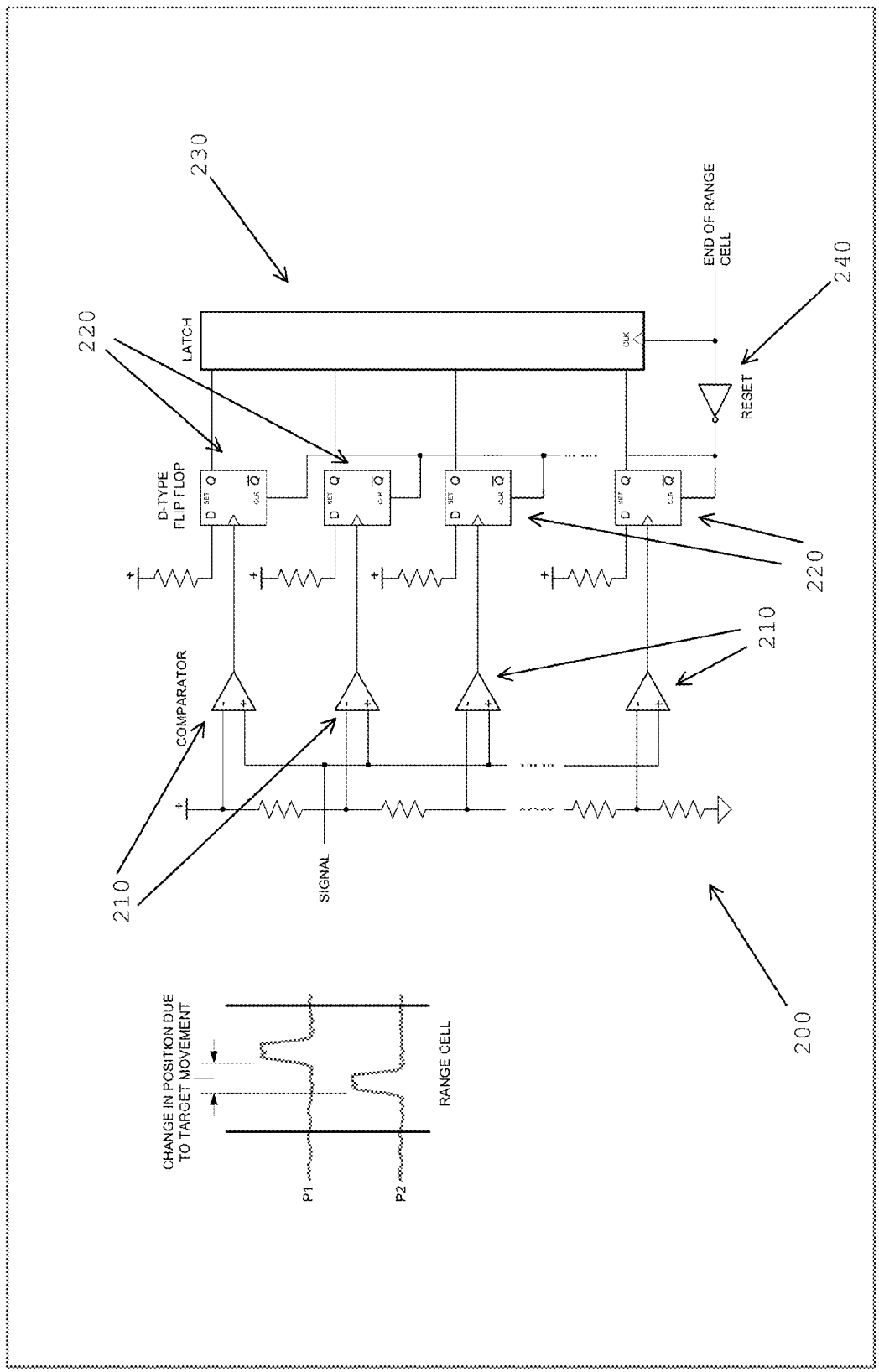
FIG. 2 is a circuit diagram according to one aspect of the invention.

Referring to FIG. 2, the circuit 200 on the right is one implementation of this aspect of the invention. As can be seen, the comparators 210 (similar to those in FIG. 1) are shown. The D flip-flops 220 are provided to capture the high (or positive) output of the comparator while the latch 230 latches when signal reaches the end of the range cell. This latch thereby locks in the state of the various comparators and captures which is the highest comparator that has been triggered. A reset gate 240 resets all the flip flops and the latch before a new pulse is sent to the target. It should be noted that while the Figures in this document use D flip-flops or JK flip-flops, other suitable types of gates, flip-flops, or other circuit elements may also be used.

To use the circuit in FIG. 2 to determine the speed at which the target is moving away from or moving towards the sensor, two or more signals are sent. The time difference between two successive reflected signal pulses (see waveforms to the right of FIG. 2) can be found. Since the distance from the sensor to the target is known for each reflected signal, the difference in distance between each reflected signal is the distance that that target has travelled in the time between the two successive reflected signals. Since the time difference between the two successive reflected signals is also known, then the distance that the target has traveled and the time it took to travel that distance gives the target's speed. For clarity, the distance from the sensor to the target can be found by multiplying the speed of the signal/pulse by the time difference from when the pulse was sent and the reflected signal was detected and then dividing the result by two.

It should be noted that peak detection within the range cell can be performed automatically using simple hardware that allows for a much slower sampling rate than the classical Nyquist sampling rate. In addition, the range cell processing load can be increased or decreased by adjusting the length of the range cell time. The increase or decrease in range cell processing load can also be performed to dynamically adjust for convergence/divergence of targets into or out of the range cell.

For clarity, it should be clear that a range cell refers to predefined time boundaries $a_1$ and $a_2$. Any reflected signals received within that range cell (i.e. after time $a_1$ and before time $a_2$) are indicative of a target that is within a specific distance $d_1$ of the sensor. An adjacent range cell, defined by time boundaries $a_2$ and $a_3$ is for reflected signals reflected from a target within a specific distance $d_2$ of the sensor with, of course, $d_2 > d_1$. It should be clear that range cells are adjustable by merely changing the values of the time boundaries defining the different range cells and, as such, the distances between a target and the sensor are dependent on the time boundaries.

In other words, in one aspect of the invention, a novel digital peak detector can be used to detect the peak maximum signal within each range cell. The received/input signal is compared to a succession of predetermined thresholds by way of a string of comparators. Each comparator whose threshold is exceeded by the incoming signal will generate (in one example) a positive output pulse. These output pulses will occur at later times for the higher threshold comparators, as the input signal ramps up (rise time), as shown in FIG. 1. The output pulses will trigger an associated D-type flip-flop (see FIG. 2). A latch, triggered by the end of the range cell pulse, will capture the peak value. Also note in FIG. 1 that the time to the peak value of the signal can be determined. It should be noted that while the examples detailed in this document use a positive logic standard (i.e. a positive or high value is generated when an event is triggered), other logic standards (e.g. a negative logic standard which generates a negative or low value when an event is triggered) may also be used.

Figure 3:
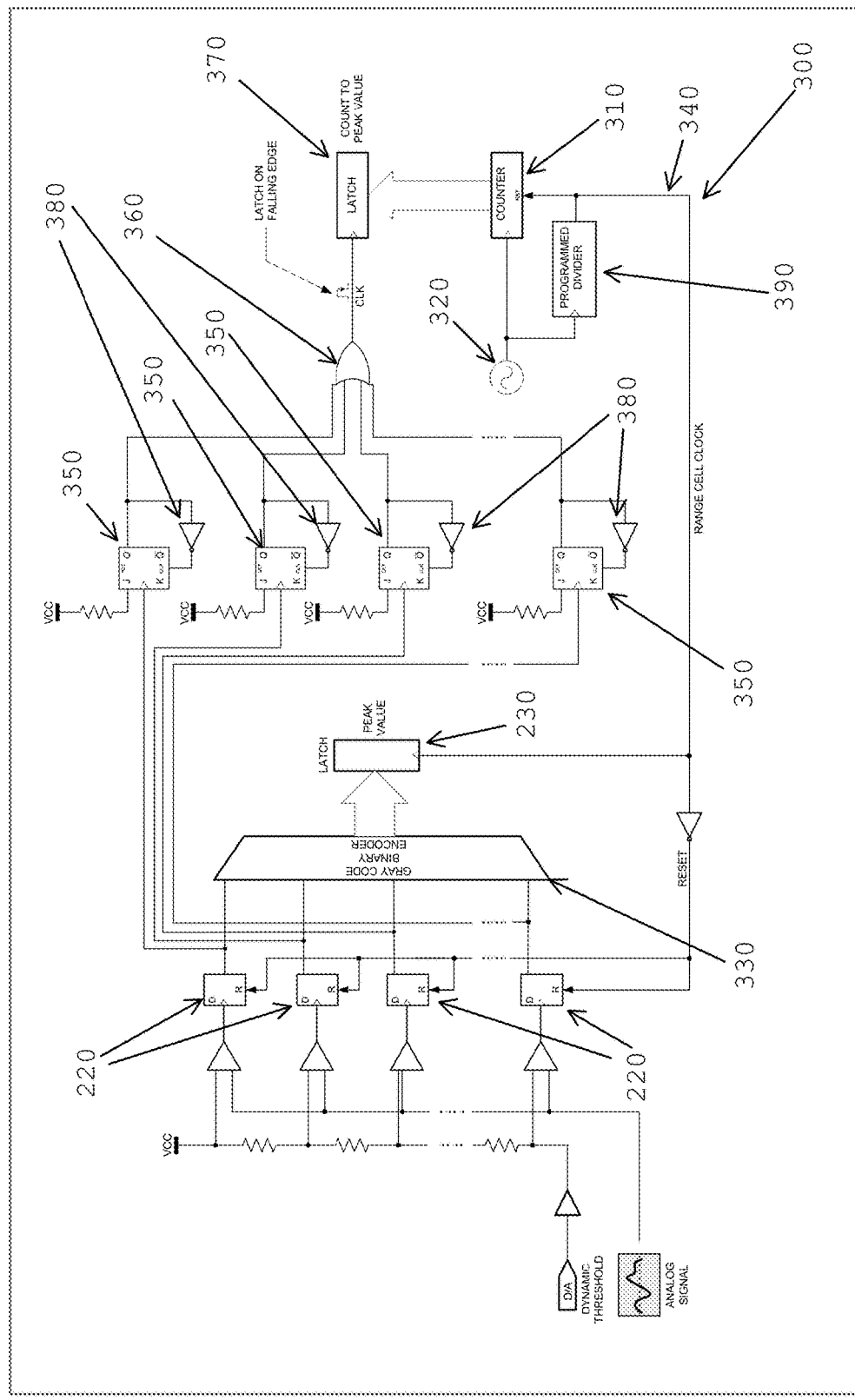
FIG. 3 is a circuit diagram according to one implementation of the invention.

Referring to FIG. 3, a circuit diagram of one implementation of the invention is illustrated. In FIG. 3, the circuit 300 uses a counter 310, driven by an oscillator 320 to count the time from the beginning of the range cell to the maximum (i.e. peak) signal. For a target moving towards or away from the sensor, the count will change for the peak signal from pulse to pulse.

In FIG. 3, the peak value captured by the D-type flip-flops 220 (by way of the binary encoder 330) is latched (using latch 230) by the range cell clock signal 340 from the programmed divider 390.

Also in the circuit in FIG. 3, the D-type flip-flops 220 also trigger J-K flip-flops 350. The outputs of the J-K flip-flops 350 are passed through an OR gate 360 to provide a clock signal for the latch 370 that latches the counts from counter 310 to the peak value of the incoming signal. Each J-K flip-flop 350 has a feedback path (using an inverter 380) to reset the associated flip-flop. This allows a higher peak value later in the range cell to latch the associated count to the peak value at that point in the range cell. In FIG. 2, the peak value will change as the rising edge of the input signal exceeds each comparator in turn. In FIG. 3, the count to peak value will be re-latched as each comparator's threshold is exceeded by the input signal.

It should be clear from FIG. 3 that the analog signal (or input signal) feeds a chain of threshold detectors. Each detector whose threshold is exceeded will output a "trigger" value (e.g. a "1" or a HIGH value) to clock the D-type flip flops within the range cell. This "1" will be latched by the associated D-type flip flop. The output of the flip flops will be fed to a latch. The range cell clock, when the end of the range cell is reached, will latch the encoded peak value and reset the D-type flip flops for the next range cell.

Regarding the timing of the circuit in FIG. 3, the output of the D-type flip flops (all of which have a common Reset signal) will also be fed to JK flip flops (each of which has an individual Reset signal) as the clock (CLK) signal. This will cause the "1" on the data (D) input to be transferred to the output (Q) on the JK flip-flops. These outputs will be fed to an OR gate and will be used to latch the count. The latched value will represent the timed or a Count-to-Peak-Value for that range cell (i.e. how many clock cycles it took from the start of the range cell before the peak value was reached).

As can be seen in FIG. 3, an oscillator 320 will drive the counter 310 and a programmed divider 390 will measure range cell time as well as provide a Reset when the end of the range cell is reached. The programmed divider 390 can be programmed for different range cell times (i.e. widths or distance for each range cell). A second programmed divider 420 (see FIG. 4) can be used to vary the Sample/<Hold> sampling rate.

Besides feeding the OR gate 360, each JK flip flop 350 output is inverted (using inverter 380) and then used to reset itself. This inversion will be slower than the OR function and the latching function to guarantee a usable pulse width. This mechanism clears the OR high state to "0" to create the latch pulse. This allows for a JK flip flop with a higher peak to latch a higher count. This means that the higher peak value will trigger the low peak value JK flip flop to the high value JK flip flops in sequence with each new trigger latching a higher Peak-Value-Count.

It should be noted that the reference voltage at the base of the resistance chain of the comparators in either FIG. 2 or FIG. 3 can be varied, as a dynamic threshold, to maintain a Constant False Alarm Rate (CFAR).

Figure 4:
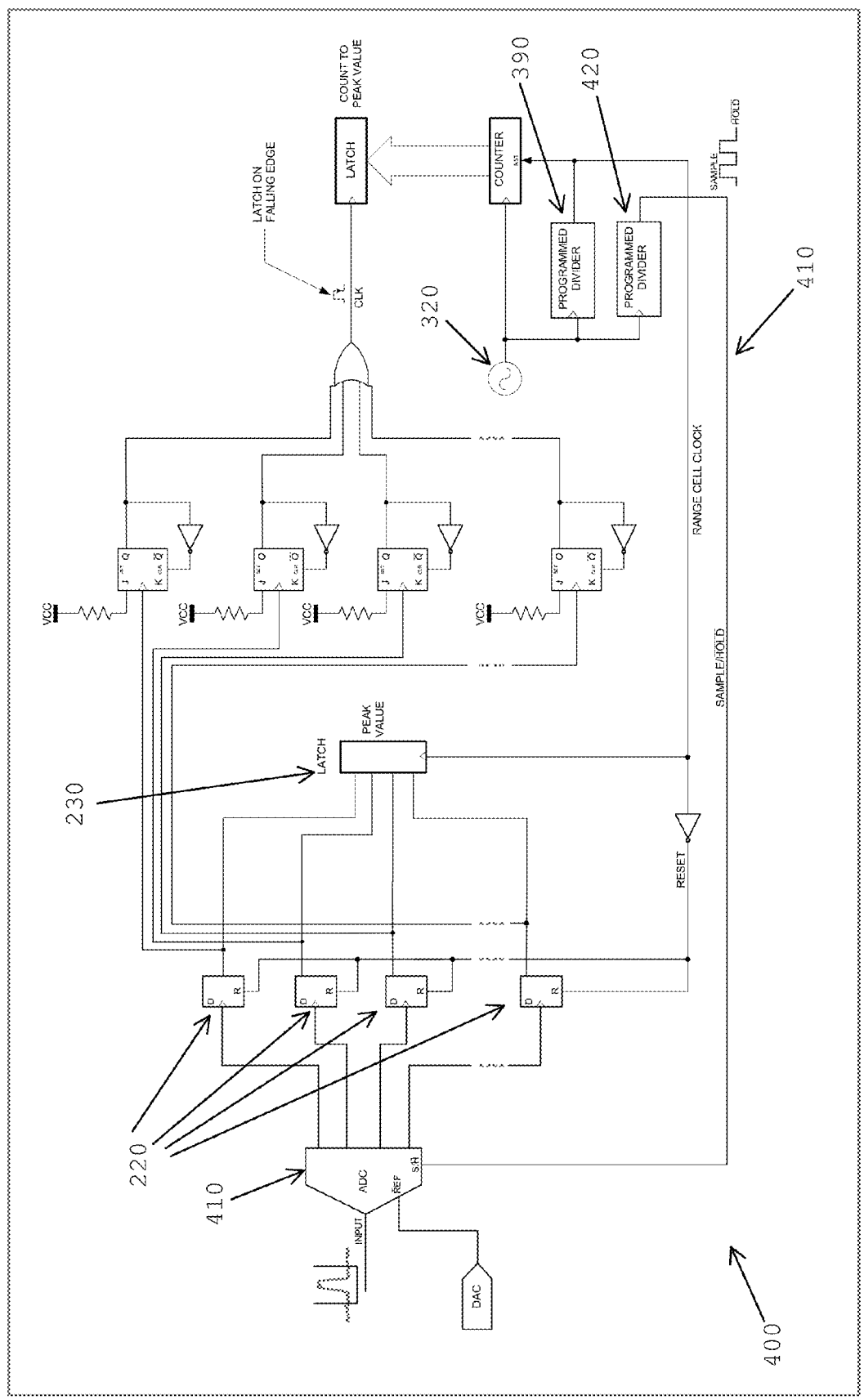
FIG. 4 illustrates a circuit diagram of another implementation of the present invention.

Referring to FIG. 4, another implementation of the invention is illustrated. In the circuit 400 in FIG. 4, instead of using a bank of comparators, an ADC (Analog to Digital Converter) 410 is used. A Sample/<Hold> clock signal 410 from a programmed divider 420 (receiving a clock signal from the oscillator 320) is run at the Nyquist sampling rate or higher (i.e. a far higher rate than that used in the circuit of FIG. 1 and FIG. 2, consistent with current radar processing techniques). The <Hold> condition "freezes" the peak value of the incoming signal long enough to clock the D-type flip flops 220. The output of the ADC 410 is the binary value of the signal detected during the SAMPLE period. This SAMPLE/HOLD cycle will continue until the end of the range cell, as determined by the programmed divider 390. It should be noted that sampling at the Nyquist frequency or higher will detect the peak signal in the range cell which will then be latched by the flip-flops 220.

As yet another alternative, a separate counter may be driven by a common time source (e.g. a GPS receiver) to give a time that is synchronised over a number of physically dispersed sites. This could then be used to time-stamp the detection of the peak value at each site. The timed-stamped target data can then be transmitted to a central site for Time Delay Of Arrival (TDOA) processing for Multilateration of the target.

Figure 5:
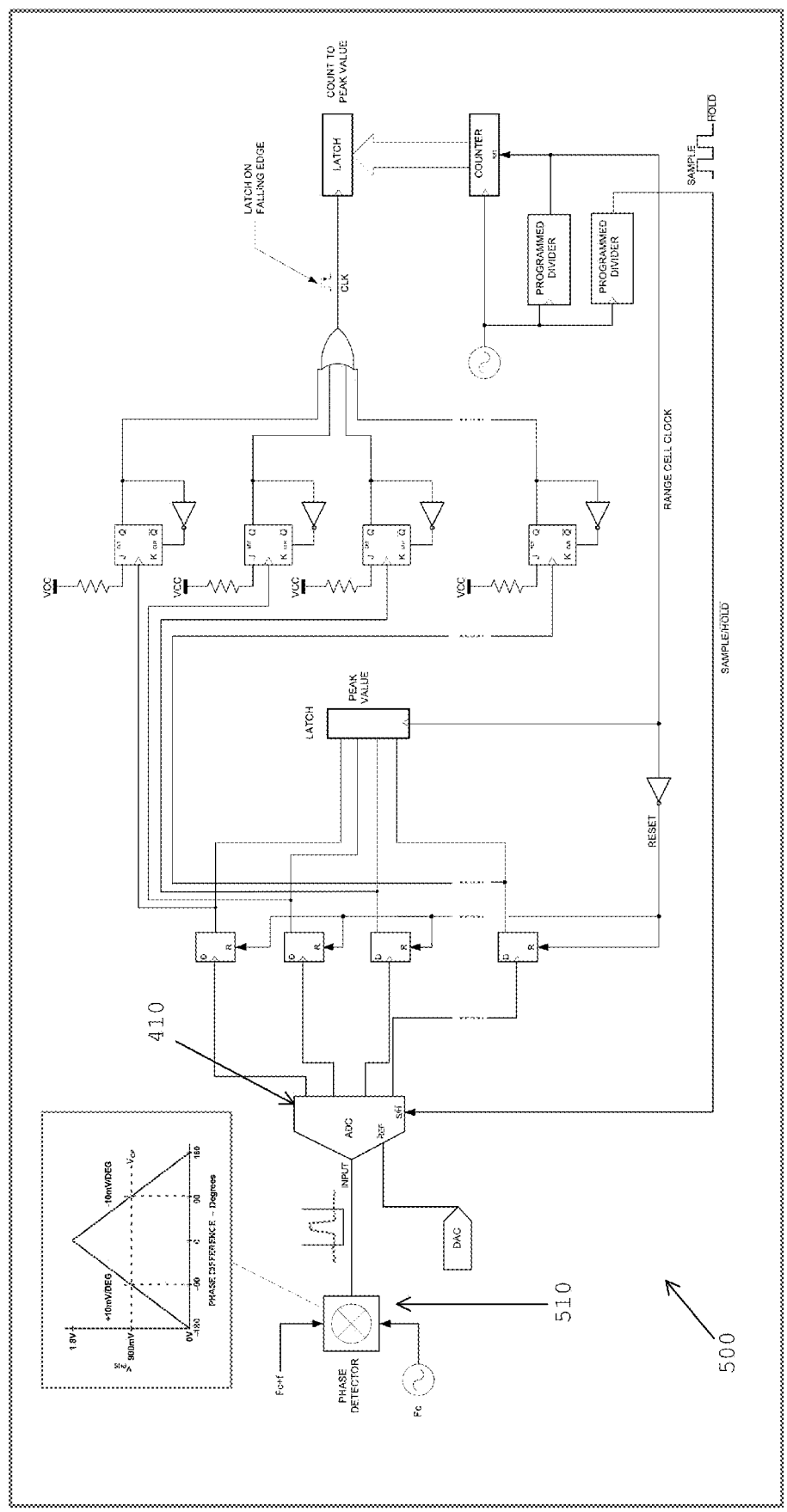
FIG. 5 illustrates a variant to the circuit illustrated in FIG. 4.

Referring to FIG. 5, an alternative to the circuit in FIG. 4 is illustrated. In this variant, a technique similar to that noted above can be used for Doppler detection (see FIG. 5). In the circuit 500 in FIG. 5, the ADC 410 is preceded by a phase detector 510 (in one implementation the Analog Devices AD8302 component is used). This phase detector 510 measures the difference in phase between the carrier $F_c$ and a reflected signal with a Doppler offset $F_c+f$, where f is the Doppler offset. Again, the greatest (Max) phase difference in a range cell is captured, along with the time (Count) to that Max phase difference.

Figure 5A:
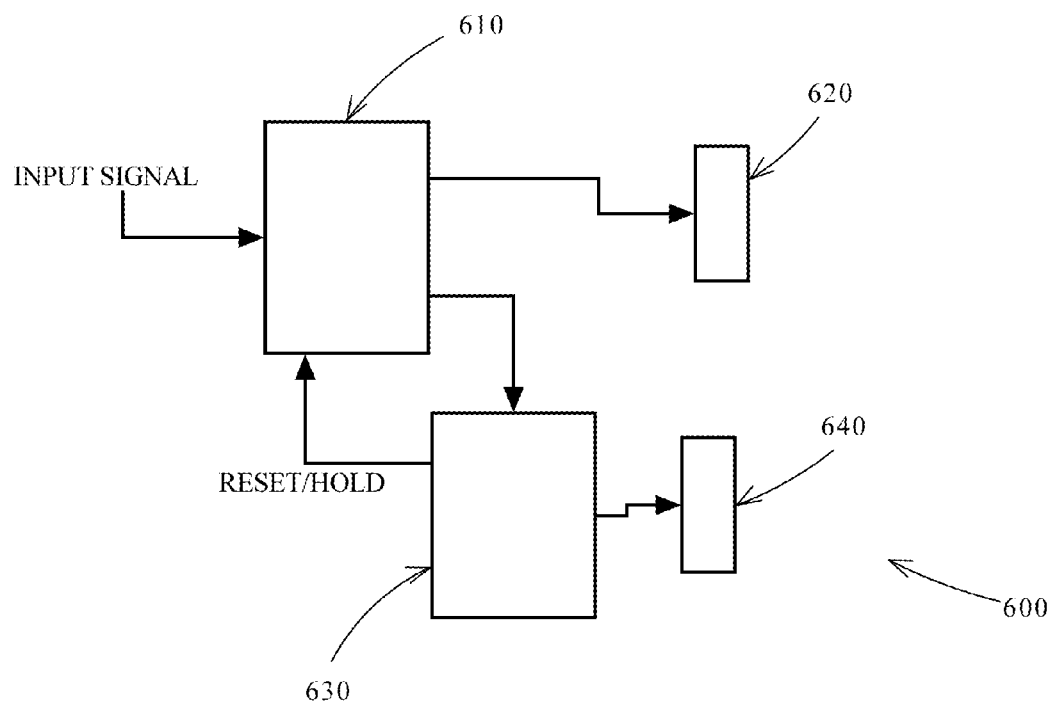
FIG. 5A is a block diagram of a system according to another aspect of the present invention.

Referring to FIG. 5A, a generalized system according to another aspect of the invention is illustrated. The systems illustrated in the previous figures can be generalized as illustrated in FIG. 5A. The system 600 has a peak detection block 610 and a peak latch 620 which latches the result (i.e. the value of the peak) of the peak detection block 610. The output of the peak detection block 610 is also sent to a clock/count block 630. The clock/count block 630 counts the number of clock cycles and, when a preprogrammed number of clock cycles have passed, this means that the end of the range cell has been reached. A reset signal is then sent from the clock/count block 630 to reset the peak detection block 610 as a new range cell has been reached. The clock/count block 630, when a peak has been reached, also latches the clock cycle count into count latch 640. This ensures that the timing (or the count) as to when a peak was reached is available.

It should be noted that the peak detection block 610 may contain the circuitry (or its variants, including other types of flip-flop circuit elements) illustrated in FIGS. 1 and 2 or the circuitry (or its variants) illustrated on the left side of FIGS. 3, 4, and 5. The clock/count block 630 may include the different variants of the circuitry illustrated on the right side of FIGS. 3, 4, and 5. This circuitry may include all the JK flip flops (or other types of flip-flop circuit elements), the OR gate, the counter, and the programmed dividers.

As an alternative to the structure of the system illustrated in FIG. 5A, the system may be implemented as a combined hardware/software system. The peak detection block and the clock/count block may be implemented using a general purpose computer or a specialized data processing device such as an ASIC (Application Specific Integrated Circuit) with suitable programming. As noted above, the peak detection block detects the peak of the signal waveform and latches the value of this peak. The clock/count block determines the count before the peak is reached. From the count, the specific range count within the range cell corresponding to the signal or waveform peak can be determined. This range cell count, of course, can be determined by a suitably programmed general computing device.

Figure 5B:
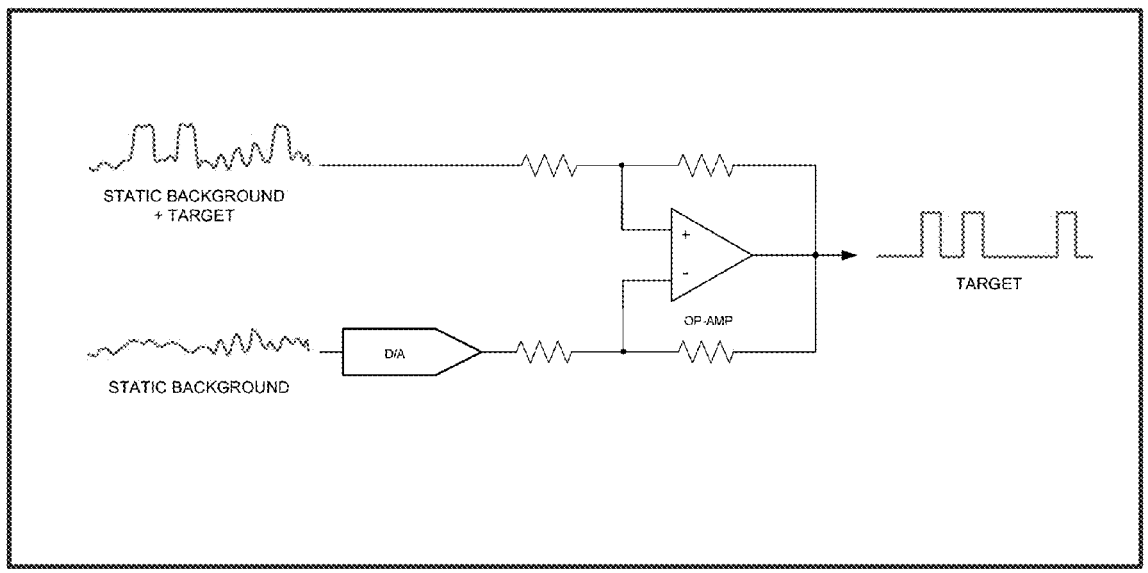
FIG. 5B illustrates a circuitry for eliminating static targets or clutter, or slow moving clutter (e.g. precipitation, clouds, etc.)

Referring to FIG. 5B, illustrated schematically is a method for eliminating fixed reflector(s)/clutter. Here, a copy of the fixed or slow moving clutter signal is subtracted from the signal containing the real-time target and clutter to extract the target. In FIG. 5B, an original signal containing the target signal and the static background is fed to an op-amp (operational amplifier). At the same time, the static background signal is passed through a digital/analog converter and the operational amplifier operates to subtract the static background signal from the original signal. The resulting signal from the subtraction is the target signal.

When using this technique for Doppler processing, it should be noted that the reflected signal from fixed reflectors may have a phase difference. However, the reflection(s) should not move from scan to scan, hence the phase difference in FIG. 5 will remain constant from pulse to pulse.

Figure 6:
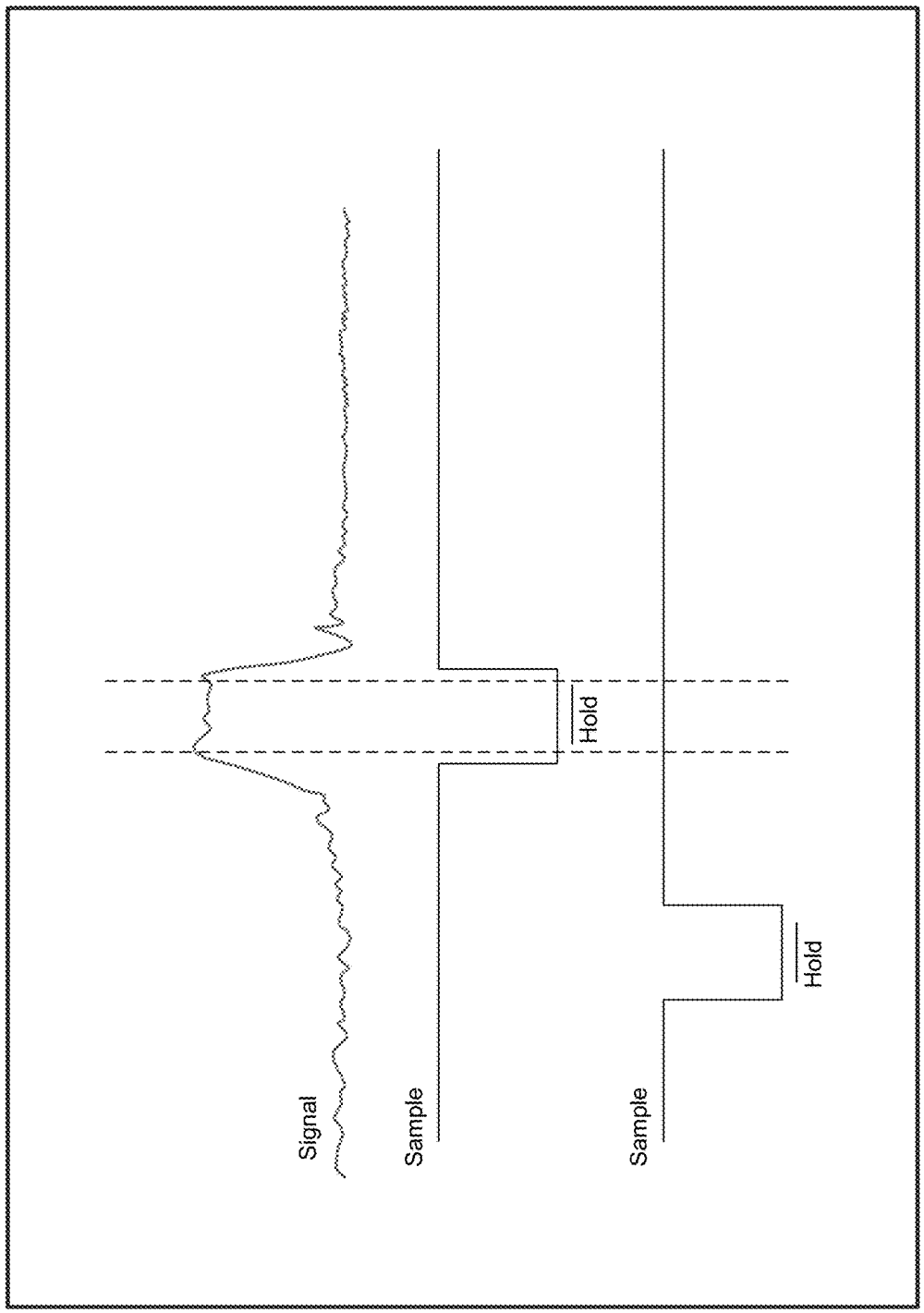
FIG. 6 illustrates a circuit similar to FIG. 5 with a staggered HOLD signal.

Since there is a possibility that the incoming signal may occur at the end of the range cell after the incoming signal has been sampled, steps may need to be taken to ensure that the signal is captured. If the incoming signal is stationary or slow moving, this incoming signal may not be detected. To overcome this deficiency, a staggered HOLD (see FIG. 6) may be used with the associated count to peak value adjustment. This would be a similar technique to the Staggered Pulse Repetition Frequency (PRF) used in traditional RADAR.

In traditional radar, there are situations where it is advantageous to expand the display of an area some way from the centre of the display. This is normally accomplished by collecting high resolution samples from the centre of the display (radar centre) to the end of the radials representing the area of interest (see bottom of FIG. 7). Software then selects the samples of the area of interest and displays these samples in an expanded "zoom" form. The high resolution samples collected at the area of interest are discarded along with the processing of these samples.

Figure 7:
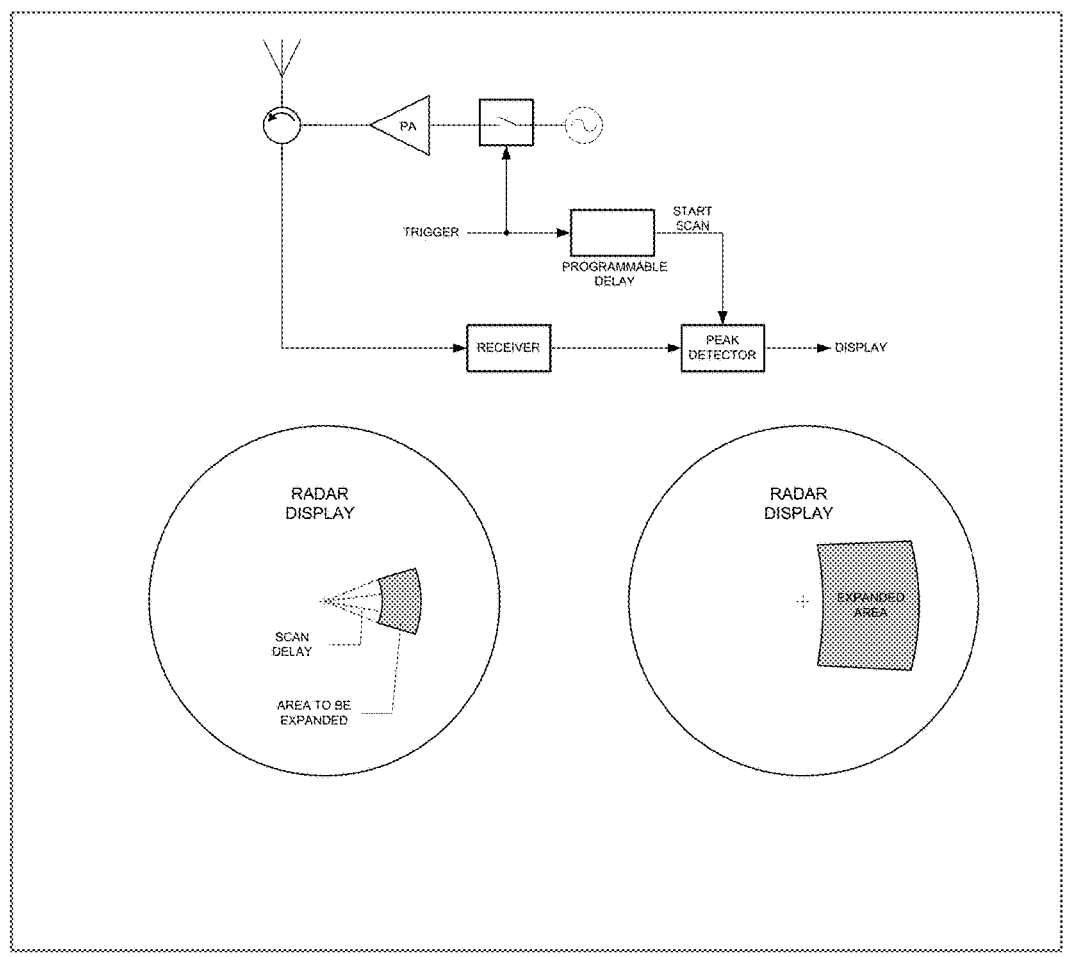
FIG. 7 shows an implementation and use for the present invention.

A hardware alternative to the above is shown at the top of FIG. 7. In this circuit, a programmable delay is used to delay the collection of high resolution samples until the start of the area of interest. The programmable delay is programmed with a delay for each radial, to start collection on that radial for the area selected. As can be imagined, the circuitry in FIG. 7 may be applied to any number of applications. As examples, the circuit may be used with traditional radar (e.g. marine radar) as well as with automotive-based radar uses.

Two examples using the above concept are provided below:

Example 1

In this example, the target is moving at 10 Miles/hr. It should be noted that, for this example, it does not matter whether the target is moving towards the sensor or away from the sensor.

Since one mile is equal to 5280 ft., then 10 Miles/hr. is equal to 52,800 ft/hr/(60 minutes×60 seconds) or to 14.67 ft./second.

Assuming a Pulse Repetition Frequency (PRF) of 500 pulses per second, then 15 ft/500=0.0293 ft target displacement between pulses.

For the display, one can assume 1000 range cells (pixels) for a 200 mile range. Each range cell is therefore 200/1000=0.2 miles=1056 ft.

If we assume the counter is driven by a 20 MHz oscillator, then each oscillator clock cycle represents 1056 ft/20×10(6)=0.0000528 ft. This means that a 0.0293 ft. displacement will have a count difference of 0.0293/0.0000528=555.56.

A 25 Bit Counter/latch would be required to count through the full range of the range cell.

If a 1 mile speed difference is considered, then 11 Miles/hr=58080 ft/hr=16.13 ft/sec. With a PRF of 500, this difference is a 0.0323 ft. displacement between pulses. The count difference is thus 0.0323/0.0000528=611.11.

The count difference between 10 Miles/hr and 11 Miles/hr is therefore 611.11−555.56=55.56 and this is easily detectable, even with jitter. It should be noted that if the oscillator had a frequency of 40 MHz, this difference would be 111.11. Conversely, if the PRF was lower, 250 rather than 500, this difference would be 111.11 for a 20 MHz oscillator and 222.22 for a 40 MHz oscillator.

It should also be noted that the rise and fall times of the interrogation signal is 100 nS. At an oscillator frequency of 20 MHz, this represents a count value jitter of about a 4 count (i.e. 200 nS) each.

Example 2

In this example, the assumption is that there are 1000 range cells (pixels) for 20 miles. It can be calculated that each range cell is 0.02 miles or 105.6 ft. If a 20 MHz oscillator is assumed, then each clock cycle represents 105.5 ft/20×10⁶ feet or 0.00000528 feet.

From the above, a 10 mile per hour speed results in a 0.03 ft. of displacement between pulses. From these values, the count is therefore 0.0293/0.00000528=5555.56.

For an 11 mph speed, there is 0.0323 ft. difference or displacement between pulses. For this speed, the count is 0.0323/0.00000528=6,111.11.

The difference between 10 MPH and 11 MPH is thus a count of 6,111.11−5555.56=555.56.

It should be clear that target movement differences of under 1 mile per hour can be detected using the systems described above.

The present invention may be used in a number of fields. In one application, the present invention may be used in automotive radar to detect changes in distance between a first vehicle having the sensor and a second vehicle directly in front of the first vehicle. Such a change in distance can be used to detect a deceleration of the second vehicle and to warn the driver of the first vehicle of such a deceleration.

Figure 8:
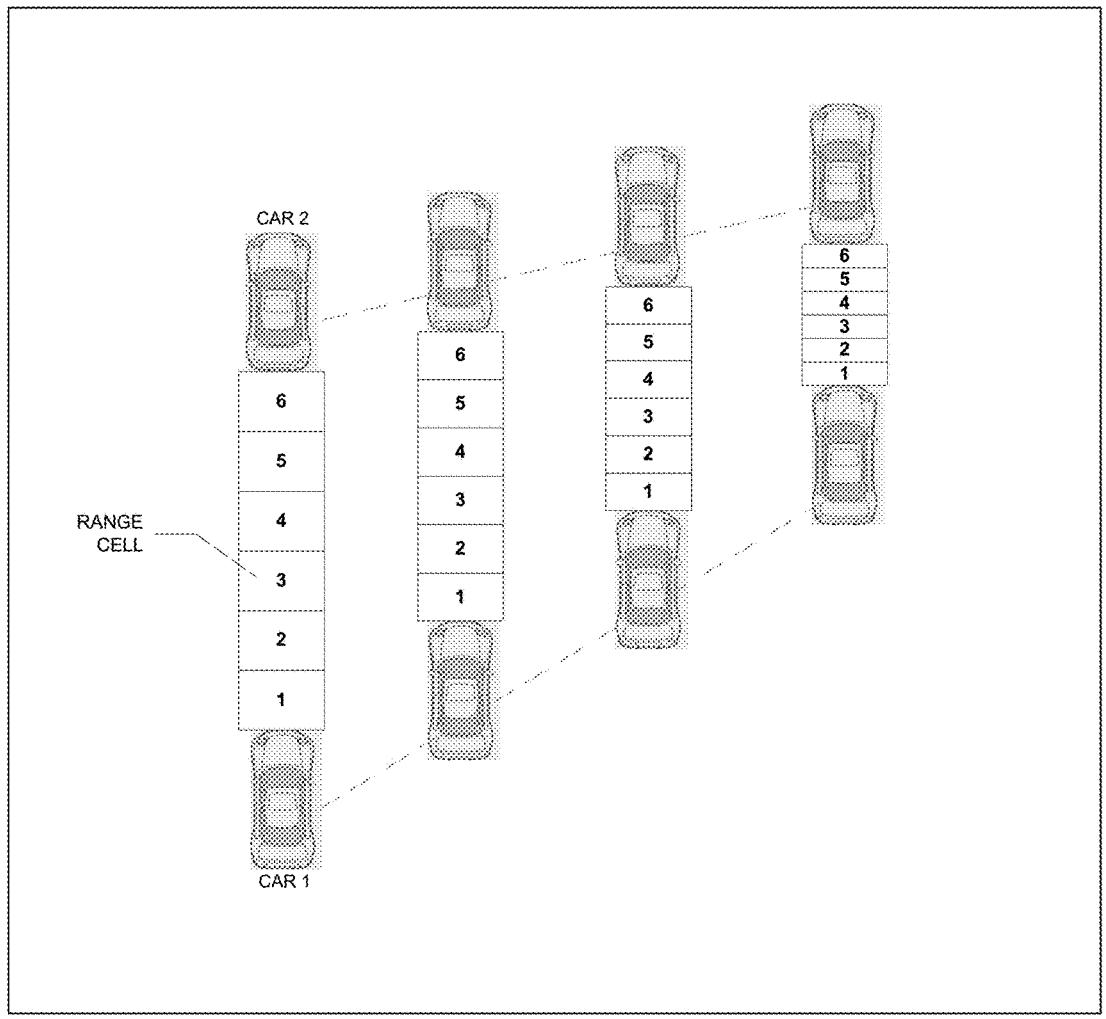
FIG. 8 is a diagram illustrating how range cell sizes can be adjusted in another implementation of the present invention.

Referring to FIG. 8, the diagram illustrates how the range cell size can be dynamically adjusted in an Automobile Collision Avoidance Radar to maximize safety while minimizing processing load and memory. In FIG. 8, a buffer zone (e.g. 6 range cells) is maintained between the sensor bearing vehicle (Car 1) and the vehicle directly ahead (Car 2). As Car 1 catches up to Car 2, Car 2 protrudes more and more into Range Cell 6, (see FIG. 8) and the range cell size can be reduced to maintain a buffer of 6 range cells. This provides better accuracy in measuring the distance between the two vehicles while the processing load and memory required remains the same.

It should be noted that, for ease of explanation, the peak detected signal is shown to be the rear bumper of the car in front. In real life, the peak detected signal will be a point on the roof of the car in front.

Automotive radar systems have a major disadvantage in that they have to trade antenna size for beam width. The beam width is normally 1-4 degrees, both in azimuth and elevation. To provide azimuth angle information, the sensor either mechanically sweeps the antenna over the Field Of View (FOV) or electronically switches between different emission/reception angles. The FOV is usually 10-15 degrees.

The same technique of scanning or electronically switching can be used for elevation (e.g. to determine clearance of an approaching overhead bridge).

Another potential issue with automobile based radars is the radar's beamwidth or the angular width of the main lobe of the radar and the associated angular resolution of the microwave radar. This issue was referred to above and can be addressed by the use of the Monopulse technique.

Figure 9:
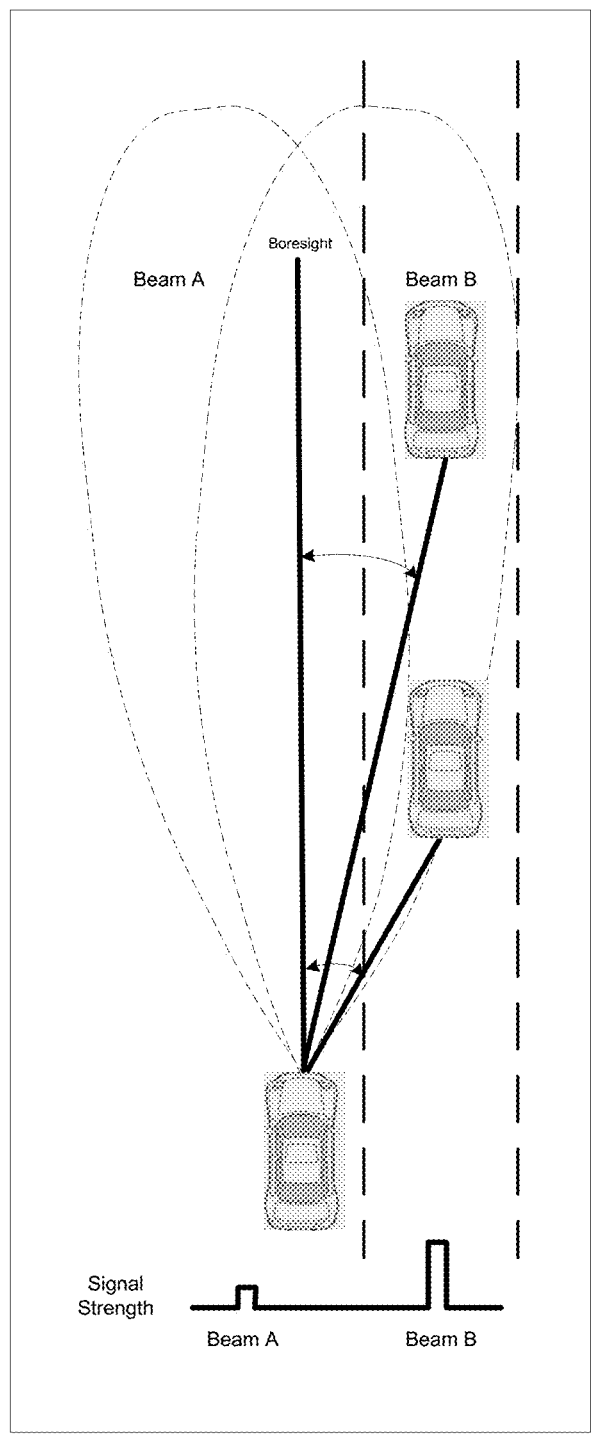
FIG. 9 is an illustration of the monopulse technique.

Referring to FIG. 9, an illustration of the monopulse technique is shown. In this technique, two antennas A and B are used and each is "squinted" off (or offset from by an azimuth angle) a common bore sight (see FIG. 9 for an illustration of the concept). Using this configuration, one can then take the ratio of:

$$\text{Log}(A)-\text{Log}(B)$$

where A is the signal amplitude or phase from antenna A and B is the signal amplitude or phase for antenna B. This ratio (independent of range) is related to the angle off bore sight (see FIG. 10A). With this monopulse technique, the azimuth resolution can be improved to $\frac{1}{10}$th to $\frac{1}{30}$th of the beam width (e.g. Eldis Monopulse Secondary Surveillance Radar has an antenna beam width of 2.2 degrees and an azimuth accuracy of +/−0.07 degrees). Assuming a FOV of 15 degrees (see FIG. 10A where the region of interest is +7.5 to −7.5 degrees azimuth), the azimuth accuracy could be 1.5 to 0.5 degrees. One advantage of this technique is in its simplicity: it is static in that it does not require mechanical or electronic scanning but has a similar accuracy to previous techniques which utilized mechanical or electronic scanning.

Potential obstacles in the distance will be close to the bore sight. However, as the vehicle moves closer to the obstacles, they should move away from the bore sight (i.e. the azimuth angle off bore sight increases) if they are not a collision risk (see FIG. 9).

Figure 11:
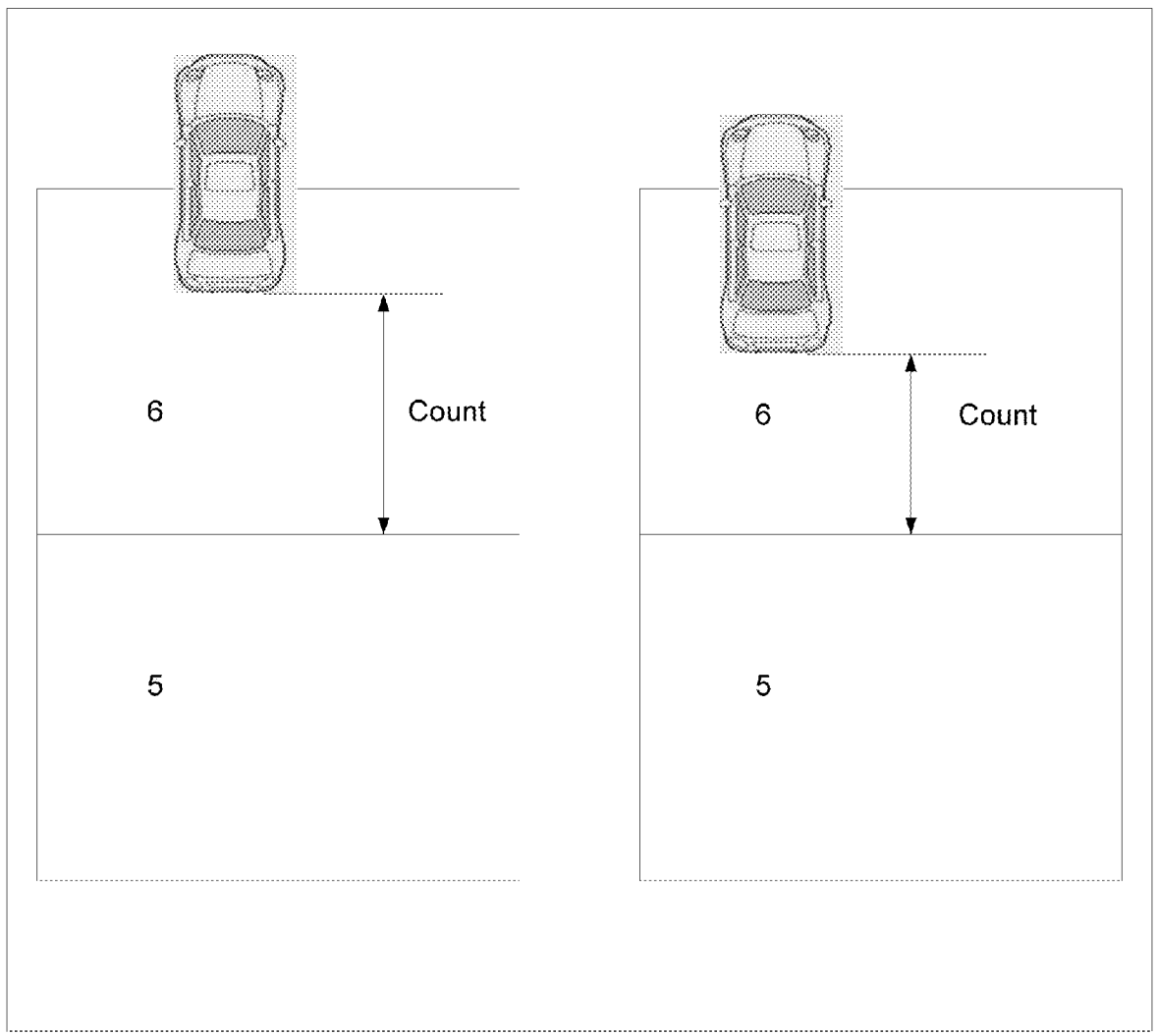
FIG. 11 illustrates how a smaller count value corresponds to a smaller distance in a range cell.

In addition to the above advantage, the rate of closure can easily be calculated from the difference in COUNT from pulse to pulse. As can be seen from FIG. 11, the COUNT for the situation on the left should be greater than the COUNT for the situation on the right. From the calculations above, since the distance per count can be calculated, the difference between the counts in the two situations can give the rate of closure between the two vehicles.

The monopulse technique can also be used to determine vertical distances. Elevation clearance (e.g. overhead clearance, something quite important for trucks and buses (e.g. double decker buses) on secondary or tertiary roads) can also be determined with the monopulse technique by using an additional one or two beams. In addition to determining overhead clearance, the present invention can also be used to detect a low level obstruction (e.g. a dead moose) in the road.

It should be noted that the azimuth and elevation beams can be mixed and matched for better resolution. Alternatively, electronic beam-steering of the beams (e.g. by adjusting the amplitude and phase of the beam(s) relative to each other) can also be used.

The accuracy of a monopulse system depends upon the stability of each of the receive paths. However, the stability can drift with environmental changes, aging of components, mud on a part of an antenna, etc. One way to address these potential issues is the static and dynamic calibration (as compared to factory calibration or routine service calibration) of the receive paths such as described in U.S. patent application Ser. No. 14/448,355, the entirety of which is hereby incorporated herein by reference. This application covers static and dynamic calibration of monopulse systems.

It should be noted that the present invention includes a calibration method for two or more antennas. The following explanation of this calibration method is made with reference to FIGS. 10A and 10B.

Figure 10A:
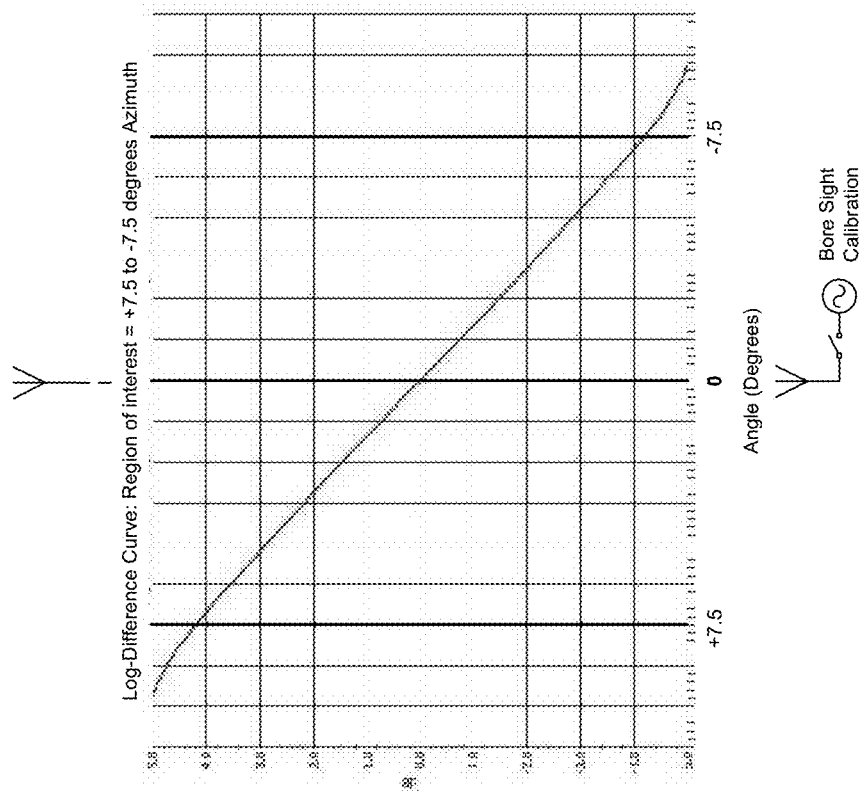
FIG. 10A is a plot detailing the amplitude for an off-boresight monopulse antenna showing a method of statically and dynamically calibrating two antenna along the boresight.

In FIG. 10A, a test signal is injected along the boresight of the two antennas. This should result in a zero amplitude or phase difference in the output of both receiver channels. Any difference is the result of an off-set in either receiver channel. This difference can then be compensated for in hardware (e.g. a change of gain in one channel) or software (e.g. a calculated correction value to be added/subtracted from the appropriate receiver channel).

Figure 10B:
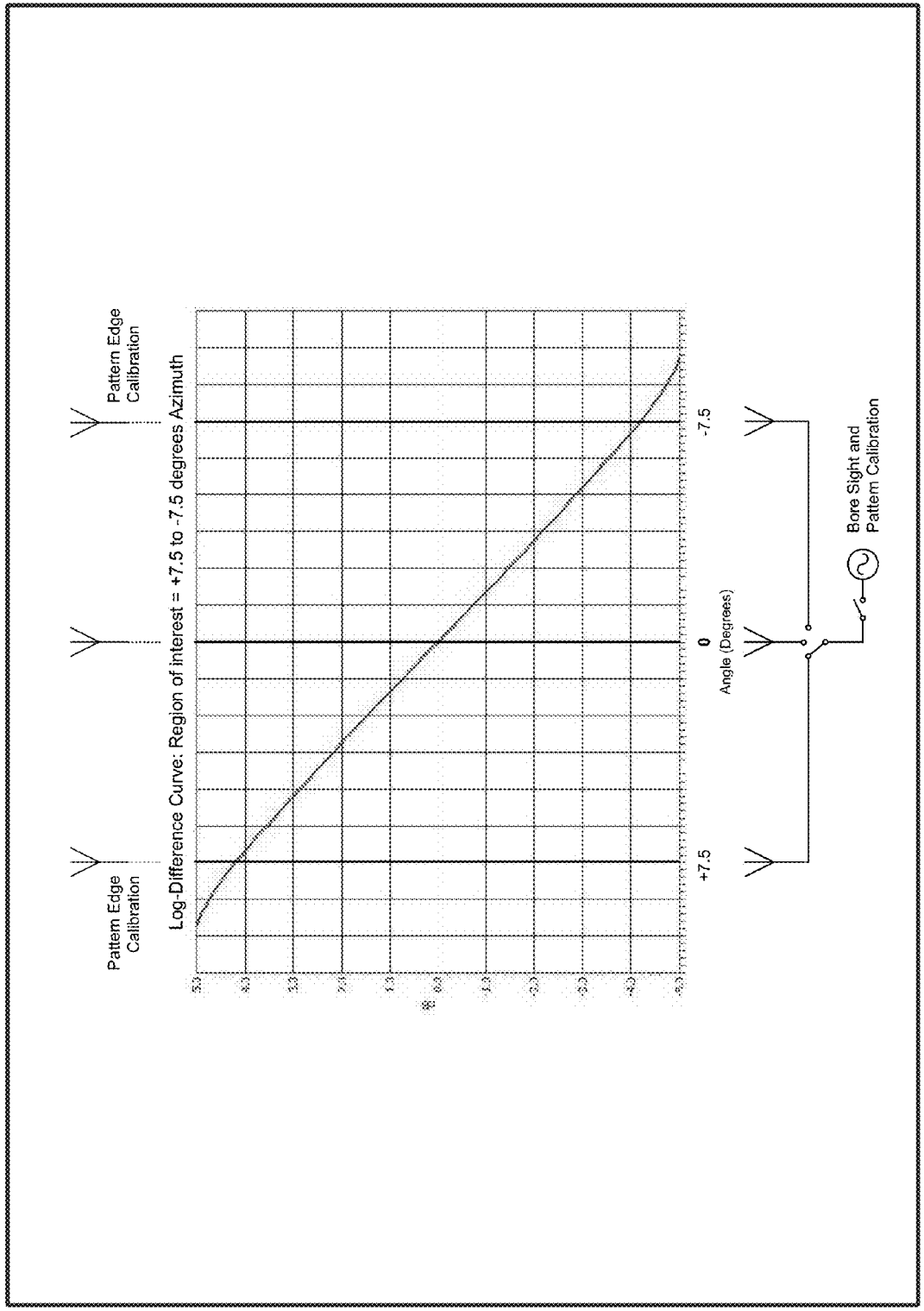
FIG. 10B is a plot detailing how the boresight and edge of beamwidth pattern can be statically and dynamically calibrated.

Referring to FIG. 10B, a test signal is also injected at the edges of the beamwidth (in this case at +/−7.5 degrees from boresight). This allows for any deterioration at the edges of the beamwidth to be detected and compensated for. It can also allow for the performance of the beamwidth between the bore sight and edges to be extrapolated, and corrected, if necessary.

Figure 12:
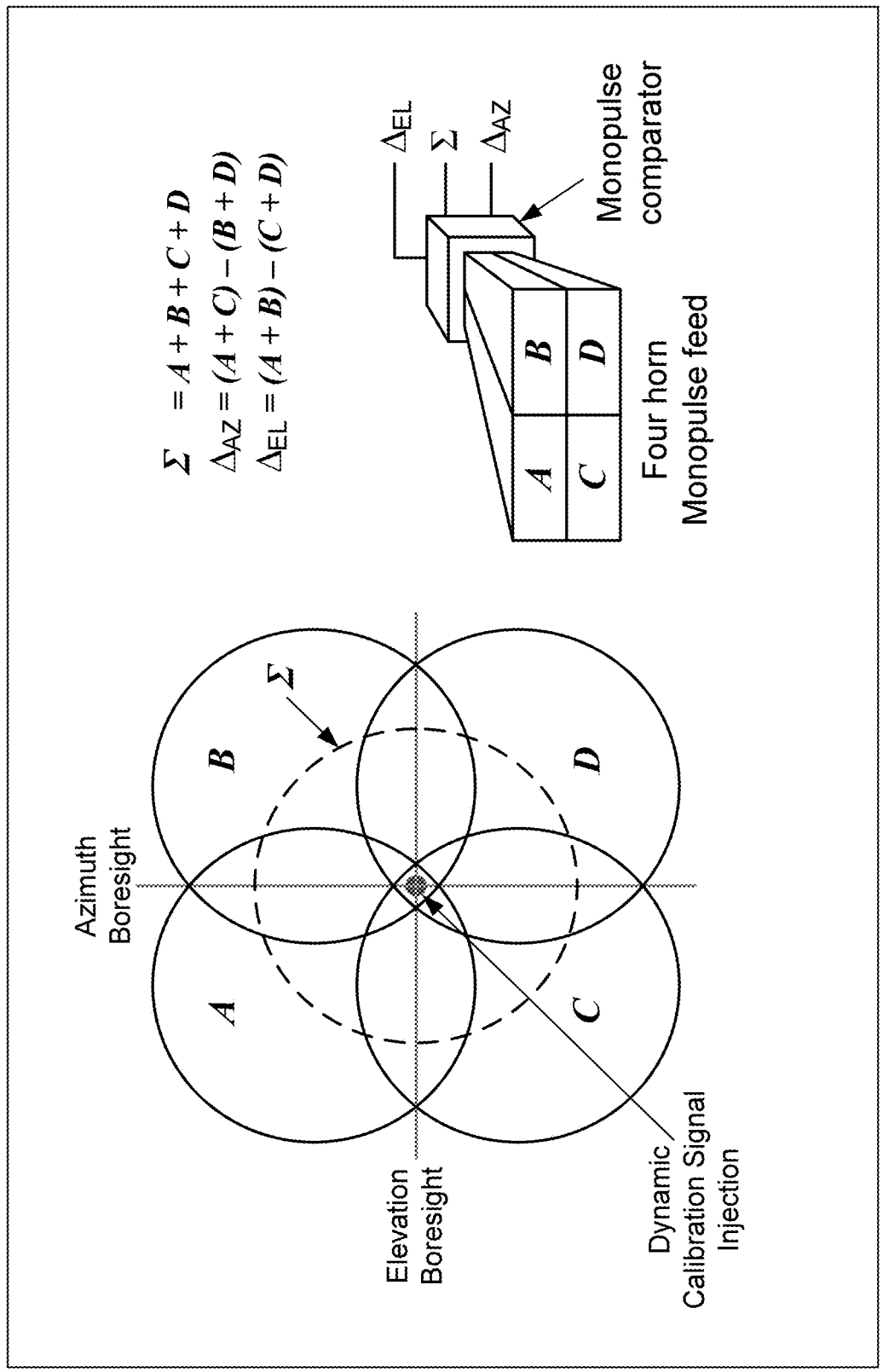
FIG. 12 details how static and dynamic calibration of a monopulse system is valid for multiple antennas.

While the techniques mentioned above and in U.S. patent application Ser. No. 14/448,355 show a 2 antenna system (see FIG. 10A), the technique is valid for additional antennae, as shown in FIG. 12. In FIG. 12, the test/calibration signal would be injected into the center of the 4 antennae and the received signals can be processed as explained above. The technique is also applicable to phased array radar antennas, such as MIT's Lincoln Laboratories Secondary Surveillance Phased Array Radar (SSPAR). This uses a 4M diameter, circular antenna with 17 elements.

SSPAR uses a site monitor (test) transponder located some distance from the array as a method of calibration (Note: to achieve its required performance it requires perfect calibration). This places some of the elements closer to the test transponder than other elements. It also makes calculation, of the offset adjustment of the test signal for each of the elements, very complex.

The alternative, in keeping with U.S. patent application Ser. No. 14/448,355 and this document, is to place the calibration signal in the center of the array.

This same technique holds true for other phased array antennas including the Aegis Air Defense RADAR antenna. Where the phased array is a 2 dimensional linear array, the technique can be used between adjacent antenna. The calibration would start at one end of the array (the datum) and each succeeding element would be adjusted to the datum.

For all the calibration methods noted above, the test signal can be injected on a routine, scheduled basis. Alternatively, it can be injected if a fault or degradation is suspected.

The embodiments of the invention may be executed by a computer processor or similar device programmed in the manner of method steps, or may be executed by an electronic system which is provided with means for executing these steps. Similarly, an electronic memory means such as computer diskettes, CD-ROMs, Random Access Memory (RAM), Read Only Memory (ROM) or similar computer software storage media known in the art, may be programmed to execute such method steps. As well, electronic signals representing these method steps may also be transmitted via a communication network.

Embodiments of the invention may be implemented in any conventional computer programming language. For example, preferred embodiments may be implemented in a procedural programming language (e.g. "C") or an object-oriented language (e.g. "C++", "java", "PHP", "PYTHON" or "C#"). Alternative embodiments of the invention may be implemented as pre-programmed hardware elements, other related components, or as a combination of hardware and software components.

Embodiments can be implemented as a computer program product for use with a computer system. Such implementations may include a series of computer instructions fixed either on a tangible medium, such as a computer readable medium (e.g., a diskette, CD-ROM, ROM, or fixed disk) or transmittable to a computer system, via a modem or other interface device, such as a communications adapter connected to a network over a medium. The medium may be either a tangible medium (e.g., optical or electrical communications lines) or a medium implemented with wireless techniques (e.g., microwave, infrared or other transmission techniques). The series of computer instructions embodies all or part of the functionality previously described herein. Those skilled in the art should appreciate that such computer instructions can be written in a number of programming languages for use with many computer architectures or operating systems. Furthermore, such instructions may be stored in any memory device, such as semiconductor, magnetic, optical or other memory devices, and may be transmitted using any communications technology, such as optical, infrared, microwave, or other transmission technologies. It is expected that such a computer program product may be distributed as a removable medium with accompanying printed or electronic documentation (e.g., shrink-wrapped software), preloaded with a computer system (e.g., on system ROM or fixed disk), or distributed from a server over a network (e.g., the Internet or World Wide Web). Of course, some embodiments of the invention may be implemented as a combination of both software (e.g., a computer program product) and hardware. Still other embodiments of the invention may be implemented as entirely hardware, or entirely software (e.g., a computer program product).

A person understanding this invention may now conceive of alternative structures and embodiments or variations of the above all of which are intended to fall within the scope of the invention as defined in the claims that follow.

I claim:

1. A system for detecting reflected radar signals, the system comprising:
    a peak detection block for detecting a highest peak in a waveform of a reflected radar signal, said peak detection block receiving said waveform from a sensor;
    a peak latch for latching and thereby storing a peak value of said waveform, said peak latch receiving a signal to latch a current value of said waveform from said peak detection block;
    a clock/count block for counting a number of cycles before said peak value is reached and for determining limits of a range cell;
    a count latch for latching a count when a peak in said waveform is reached, said count latch receiving a signal to latch a current value of a count from said clock/count block;
    wherein
        said peak detection block divides a maximum expected magnitude of said reflected signal into ranges with each range being defined by predetermined values;
        said peak detection block continuously compares said current value of said waveform with said predetermined values such that every highest predetermined value that is exceeded by said current value of said waveform generates said signal to latch said current value as said peak value;
    said clock/count block sends a reset signal to said peak detection block once an end of a range cell has been reached; and said clock/count block comprises:
        an oscillator for providing a clock signal;
        a first programmed divider receiving an output of said oscillator, said first programmed divider providing a reset signal for said peak detection block;
        a counter receiving an output of said oscillator, an output of said counter being received by said count latch.

2. The system according to claim 1 wherein said peak detection block comprises a plurality of comparators coupled in parallel and receiving said waveform, each comparator being for comparing a current value of said waveform with a specific predetermined value different from predetermined values for other comparators, each comparator having a specific output when said current value of said waveform is greater than said specific predetermined value.

3. The system according to claim 2, wherein an output for each comparator is stored by a flip flop.

4. The system according to claim 3, wherein said peak detection block comprises an encoder receiving outputs of said flip flops.

5. The system according to claim 1, wherein said peak detection block comprises an analog to digital converter (ADC) for digitizing said waveform, an output of said ADC being stored by a plurality of flip flops.

6. The system according to claim 1, wherein said clock/count block comprises a plurality of flip flops for storing a peak value of said waveform.

7. The system according to claim 6, wherein outputs of said flip flops are received by an OR gate, said OR gate providing a latch signal for said count latch.

8. The system according to claim 1, wherein said clock/count block comprises a second programmed divider receiving an output of said oscillator, said second programmed divider providing a sample/hold signal for said peak detection block.

9. The system according to claim 1, wherein said system is used in vehicle based applications.

10. A circuit for detecting a peak value of a waveform, the circuit comprising a plurality of comparators coupled in parallel and receiving said waveform, each comparator being for comparing a current value of said waveform with a specific predetermined value different from predetermined values for other comparators, each comparator having a specific output when said current value of said waveform is greater than said specific predetermined value,
wherein
said waveform is a reflected signal from a radar;
said circuit is configured for detecting a highest peak in said waveform by continuously comparing said current value of said waveform with said predetermined values such that every highest predetermined value that is exceeded by said current value of said waveform generates a signal to latch said current value as said peak value of said waveform;
said circuit is configured for dividing a maximum expected magnitude of said reflected signal into ranges with each range being defined by said predetermined values;
said circuit further comprises a clock/count block for counting a number of cycles before said highest peak is reached and for determining limits of a range cell.

11. The circuit according to claim 10, wherein outputs of said comparators are stored by a plurality of flip flops.

12. The circuit according to claim 11, wherein outputs of said plurality of flip flops are latched by a peak latch.

13. A method for detecting a reflected signal, the method comprising:
a) transmitting a radar signal;
b) receiving a signal;
c) passing a waveform of said signal through a plurality of comparators coupled in parallel and to thereby detect a highest peak in said waveform, each of said comparators continuously comparing a current value of said waveform with a specific predetermined value;
d) for each of said plurality of comparators, in the event said current value exceeds said specific predetermined value, outputting a trigger value;
e) using said trigger value to latch a current value of said waveform as a peak value of said waveform;
f) determining which range cell count corresponds to said peak value;
wherein
a maximum expected magnitude of said reflected signal is divided into ranges with each range being defined by predetermined values;
steps c) and d) are executed such that every highest predetermined value that is exceeded by said current value of said waveform outputs said trigger value so that said current value is latched as said peak value.

14. The method according to claim 13, wherein step f) comprises determining how many clock cycles have passed since said radar signal was sent before said current value was detected.

15. The method according to claim 14, wherein step f) comprises dividing a number of clock cycles by a predetermined value to determine which range cell said peak value belongs to.

16. The method according to claim 13, wherein said method is used with a monopulse radar system for detecting rates of change in distance between a detector and at least one target.

17. The method according to claim 13, wherein said method is used for monopulse processing.

18. The method according claim 13, wherein said method is used for calibration of monopulse receiver channels.

19. The method according to claim 13, wherein a start of a radar scan is delayed on a radial basis to eliminate collection and processing of near-in data when offsetting a radar display.

* * * * *